US012244337B2

(12) United States Patent
Patterson et al.

(10) Patent No.: US 12,244,337 B2
(45) Date of Patent: Mar. 4, 2025

(54) METHODS, MEDIUMS, AND SYSTEMS FOR TESTING FIBER OPTIC TELECOMMUNICATION SYSTEMS

(71) Applicant: SUBCOM, LLC, Eatontown, NJ (US)

(72) Inventors: William W. Patterson, Freehold, NJ (US); D. Mark Havens, Wall, NJ (US); Robert P. Bellomo, Montclair, NJ (US); Bamdad Bakhshi, Asbury Park, NJ (US); Robert Behringer, Monmouth Beach, NJ (US); Roberto Mattos, Morganville, NJ (US); Ying Jiang, Metuchen, NJ (US); William C. Barnett, Freehold, NJ (US); Mark Enright, Hampton, NJ (US)

(73) Assignee: SubCom, LLC, Eatontown, NJ (US)

( * ) Notice: Subject to any disclaimer, the term of this patent is extended or adjusted under 35 U.S.C. 154(b) by 238 days.

(21) Appl. No.: 17/460,182

(22) Filed: Aug. 28, 2021

(65) Prior Publication Data

US 2023/0062982 A1 Mar. 2, 2023

(51) Int. Cl.
*H04B 10/07* (2013.01)
*H04B 10/075* (2013.01)
(Continued)

(52) U.S. Cl.
CPC .......... *H04B 10/07* (2013.01); *H04B 10/075* (2013.01); *H04B 10/0773* (2013.01);
(Continued)

(58) Field of Classification Search
CPC .... H04B 10/07; H04B 10/073; H04B 10/075; H04B 10/0773; H04B 10/0775;
(Continued)

(56) References Cited

U.S. PATENT DOCUMENTS 6,385,552 B1 * 5/2002 Snyder ................. H04B 10/079
702/123
6,542,841 B1 * 4/2003 Snyder ............... H04B 10/0795
702/108

(Continued)

OTHER PUBLICATIONS

European Search Report dated Sep. 22, 2022, for the EP Patent Application No. 22162344.0 filed on Mar. 15, 2022, 4 pages.

*Primary Examiner* — Dibson J Sanchez
(74) *Attorney, Agent, or Firm* — KDW Firm PLLC

(57) ABSTRACT

This application describes techniques for testing fiber optic telecommunication systems, such as undersea fiber optic cable systems. Testing terminals may be deployed at a location of terminating equipment for a fiber optic cable. The testing terminals may be operated remotely. The testing terminals may be configured to programmatically test the cable by loading one or more tests and automatically configure the cable's transmitters and receivers based on predetermined loading schemes selected based on the tests to be performed. The testing terminals may iterate over channels and fiber pairs of the cable and may use back-to-back tests to remove artifacts from test results. Using the described techniques, a cable's channels and fiber pairs can be fully characterized in the amount of time afforded for a typical testing schedule, which was not generally possible using conventional testing.

19 Claims, 8 Drawing Sheets

(51) Int. Cl.
*H04B 10/077* (2013.01)
*H04Q 11/00* (2006.01)

(52) U.S. Cl.
CPC ...... *H04B 10/0775* (2013.01); *H04B 10/0779* (2013.01); *H04Q 11/0062* (2013.01); *H04Q 2011/0079* (2013.01); *H04Q 2011/0083* (2013.01)

(58) Field of Classification Search
CPC ....... H04B 10/0779; H04Q 2011/0083; H04Q 11/0062; H04Q 2011/0079
USPC ....................................... 398/9–38
See application file for complete search history.

(56) References Cited

U.S. PATENT DOCUMENTS

| | | | | |
|---|---|---|---|---|
| 6,614,968 | B1* | 9/2003 | Eslambolchi | G02B 6/4469 385/100 |
| 6,959,126 | B1* | 10/2005 | Lofland | G01M 11/337 398/19 |
| 7,340,166 | B1* | 3/2008 | Sylvester | H04Q 11/0005 398/45 |
| 7,711,267 | B2* | 5/2010 | Wellbrock | H04L 43/0811 398/9 |
| 9,800,330 | B1 | 10/2017 | Yusuf et al. | |
| 10,491,296 | B1* | 11/2019 | Wellbrock | H04B 10/073 |
| 2002/0057477 | A1* | 5/2002 | Rocca | H04J 14/0279 398/104 |
| 2003/0115028 | A1* | 6/2003 | Summerfield | H04B 10/07 703/6 |
| 2004/0096215 | A1* | 5/2004 | Evangelides, Jr. | H04B 10/075 398/33 |
| 2004/0096216 | A1* | 5/2004 | Ito | H04B 10/0775 398/33 |
| 2004/0208503 | A1* | 10/2004 | Shieh | H04B 10/071 398/13 |
| 2007/0025676 | A1* | 2/2007 | Russell | G01M 11/3136 385/100 |
| 2008/0232760 | A1* | 9/2008 | Xia | H04B 10/0775 385/140 |
| 2009/0323050 | A1* | 12/2009 | Tekawa | G01M 11/3145 356/73.1 |
| 2010/0253936 | A1* | 10/2010 | Xia | G01M 11/333 356/73.1 |
| 2010/0266275 | A1* | 10/2010 | Xia | H04B 10/0773 398/16 |
| 2014/0086573 | A1* | 3/2014 | Zhang | H04B 10/071 398/16 |
| 2015/0062562 | A1* | 3/2015 | Kassler | G01M 11/3154 356/73.1 |
| 2015/0086194 | A1* | 3/2015 | Kassler | H04B 10/0773 398/28 |
| 2017/0111258 | A1* | 4/2017 | Bezold | H04L 41/0853 |
| 2019/0137355 | A1* | 5/2019 | Nakatani | G01M 11/3136 |
| 2021/0076113 | A1 | 3/2021 | Wolf et al. | |
| 2021/0302660 | A1* | 9/2021 | Garrett | G02B 6/354 |
| 2022/0103251 | A1* | 3/2022 | Weiss | H04B 10/0791 |
| 2022/0312087 | A1* | 9/2022 | Takahashi | H04J 14/02 |

* cited by examiner

METHODS, MEDIUMS, AND SYSTEMS FOR TESTING FIBER OPTIC TELECOMMUNICATION SYSTEMS

BACKGROUND

Fiber optic telecommunication systems carry much of the world's data between different geographical locations. Such systems are generally made up of cables that include one or more pairs of optical fibers—for example, many of today's telecommunication system cables include up to twelve (12) pairs of optical fibers. Each fiber may carry data on multiple channels, which may represent physical or logical divisions of the fiber. For instance, in a wavelength division multiplexing (WDM) scheme, the light transmitted onto a given fiber is transmitted by a laser at different wavelengths (each wavelength corresponding to a channel). Other types of channels also exist (e.g., time channels for time division multiplexing). A typical fiber might be divided, for instance, into up to one hundred and twenty (120) channels.

When a fiber optic telecommunication system is deployed, it is generally tested to ensure that it performs as expected. Conventional testing techniques tend to be quite slow, which limits the amount of testing that can be performed in a reasonable amount of time or at a reasonable cost. According to one estimate it would take more than 1000 hours (84 days) to perform a full set of bi-directional measurements on all 120 channels of a 12-fiber-pair system using conventional testing. This is an unacceptable amount of testing time, and most system deployment contracts specify a much shorter duration (or commensurate amount of budget) that is available to perform the tests—e.g., on the order of a day.

Accordingly, in order to perform adequate testing in a reasonable amount of time, certain simplifications may be made to the testing regimen. For example, although a cable might include 12 fiber pairs, each carrying 120 channels of data, a typical testing regimen is only able to test about 20 channels on a single fiber pair. Moreover, even though bidirectional testing may yield better results, only unidirectional testing is typically performed. Still further, although a system might include several cables (e.g., trunk cables and branch cables extending to different locations), only the cable for which it is the most difficult to achieve the specified performance of the system is typically tested.

These simplifications allow testing to be performed within a limited time and budget but do come with drawbacks. It requires a great deal of expertise to select the cables, fibers, and channels that will be tested in order to yield representative test results. Experts must also select the equipment configurations that will be used to perform the testing, the actual tests that will be performed, etc. Even with an expert tester, there is no guarantee that the subset of configurations and tests selected will generate results that accurately reflect the way that the full system will perform.

These problems are compounded by the fact that the complexity of fiber optic telecommunication systems is increasing rapidly, with more fiber pairs carrying more dataThe number of fibers and the capacity supported by these systems will continue to increase for the foreseeable future, making accurate testing potentially even more time consuming.

In an undersea fiber optic telecommunication system like MAREA, Dunant, or Grace Hopper, optical cables may be arranged along the seabed to connect two or more points on land. This configuration presents a number of unique challenges, especially when it comes to testing. Many of the components in such a system are located on the ocean floor many miles away from land and cannot be readily accessed for configuration or assessment. Moreover, the ends of the cables may be located on different continents, making it particularly difficult to initiate and execute tests.

Exemplary embodiments described herein address these problems by providing new fiber optic telecommunication system testing techniques. Although the techniques described herein are particularly well-suited to use with undersea fiber optic telecommunication systems, they can also be applied to terrestrial fiber optic telecommunication systems.

BRIEF SUMMARY

Exemplary embodiments relate to computer-implemented methods, as well as non-transitory computer-readable mediums storing instructions for performing the methods, apparatuses configured to perform the methods, etc. The summary and description below reference particular embodiments; unless otherwise noted, it is contemplated that these embodiments may be deployed separately to achieve the advantages noted, or in any combination to achieve further synergistic effects.

According to a first embodiment, a testing interface may be displayed on a computing device. The interface may be configured to present testing options for testing a fiber optic telecommunication system. A selection of a set of the testing options may be received using the interface. In response to receiving the set of testing options, a test set configuration structure may be accessed, where the structure includes a plurality of predetermined configurations for the fiber optic telecommunication system. One of the predetermined configurations may be automatically selected based on the selected set of testing options, and the fiber optic telecommunication system may be programmatically configured with the selected predetermined configuration. The configured fiber optic telecommunication system may be tested using the selected set of testing options to generate test results. The testing may include communicating between a first testing terminal physically located at a first end of the fiber optic telecommunication system and a second testing terminal physically located at a second end of the fiber optic telecommunication system. The test results may be stored in a non-transitory computer-readable storage medium.

Especially in the case where multiple tests need to be conducted, automatic configuration based on the test set configuration structure allows the tests to be iterated through much more quickly than in conventional testing paradigms. Because the system is programmatically configured and tested in this way, testing can be carried out in a matter of hours, instead of months. In one experiment using the 120-channel, 12 fiber-pair configuration discussed above, testing time was reduced from 84 days to a single day.

Moreover, because these improvements speed up the testing process, more tests can be conducted on more channels and more fibers than in a conventional testing regime. Accordingly, whereas conventional testing requires that an expert user select tests and fiber configurations that the expert believes will be representative of overall system performance, exemplary embodiments can instead fully characterize a fiber without the need to make these selections.

According to a second embodiment, the first and second testing terminals may communicate over any of a number of possible paths. A first option is for the terminals to communicate over the fiber currently being tested (e.g., the fiber carries both the test data and instructions, commands, or other information used by the testing terminals). An advantage of the first option is that it allows testing to be performed on cables in which the fiber pairs terminate at different locations. For instance, if the cable does not include a second fiber pair that goes to the same location as the second testing terminal, the terminals can still communicate over the fiber pair under test. Another advantage of the first option is that it does not consume the resources of a second fiber pair, allowing that fiber pair to be used for other purposes (e.g., commissioning, acceptance testing, or commercial traffic). Yet another advantage of the first option is that it does not require additional terminal equipment which would be needed to establish communications over a second fiber pair.

A second option is for the terminals to communicate using a communications path independent of the cable carrying the fiber being tested (e.g., the terminals may communicate using an independent Internet or other network connection that does not rely on the cable being tested). This option has similar advantages to the first option, but can be somewhat challenging because the testing terminals need to establish a separate, independent connection (which might result in latency and poor connection quality). Nonetheless, it avoids tying up an additional fiber pair and may be preferable if it is not feasible to utilize the fiber pair under test.

A third option is for the terminals to communicate on the cable carrying the fiber being tested, but on a second fiber of the cable that is not under test. This option avoids the need to communicate on the same fiber that is being tested but does require that a second fiber pair that connects to the second testing terminal location be made available. It may also require additional terminal equipment to establish communications over a second fiber pair.

According to a third embodiment, the predetermined configurations may include loading schemes for the fiber optic telecommunication system. The loading schemes may be, for instance, a flat input spectrum loading scheme, an optical signal-to-noise ratio optimized loading scheme, or an optimized generalized optical signal-to-noise ratio loading scheme. Depending on the configuration of the fiber optic telecommunication system and the tests being performed, different loading schemes (describing, e.g., the input power profile that determines how the transmitter generates a signal across its usable spectrum) may be needed. For instance, different loading schemes may be needed depending on what fiber characteristics are being measured, the nature or configuration of amplifiers in the fiber optic telecommunication system, fiber propagation effects, etc. The predetermined configurations may define the loading schemes to be used with various combinations of test parameters, which may be retrieved and automatically applied by the testing equipment as the testing equipment iterates over the available/selected tests.

According to a fourth embodiment, the testing may access values from a back-to-back test. A back-to-back test may refer to a set of tests used to remove testing equipment artifacts from the test results. A first test may be performed using the testing terminal in a lab, and a second test may be performed using the testing terminal once deployed to the testing site. By looping the test set back on itself, the character of the testing terminal can be removed from the test data (e.g., the artifacts and contributions of the test equipment to the test data). The purpose of such back to back tests after the terminal has been deployed to the testing site is to determine if something changed during shipping or deployment of the test equipment.

According to a fifth embodiment, the testing may be bidirectional and configured to fully characterize channels and fiber pairs in a cable. Unlike conventional techniques that generally rely on unidirectional testing as an approximation of the performance of a fiber pair, exemplary embodiments provide straightforward bidirectional testing that actually evaluates the performance of the system.

According to a sixth embodiment, the testing may be initiated through a remote connection to the first testing terminal and the second testing terminal. This allows testing to be carried out remotely by connecting to the first testing terminal over the remote connection, thus allowing a user to initiate and run a test without the need to be physically present at the testing site.

According to a seventh embodiment, the testing may automatically iterate over a plurality of channels for a fiber pair at a rate sufficient to substantially fully characterize the fiber pair in 4 hours or less. By automatically configuring the fiber optic telecommunication system for testing on multiple channels, downtime is reduced and tests can be carried out on all of the channels in each fiber pair of the cable. This can be achieved in a relatively short period of time. In one test, a 120-channel fiber pair was fully characterized through bidirectional testing of gain shape, OSNR, and GOSNR in only about two hours and ten minutes. It is estimated that a 12 fiber-pair cable could be characterized in about 24 hours with appropriate transponders and line cards—a time savings of 97.6% compared to conventional testing techniques. In practical commercial settings (where the complexity of available transponders and the number of available line cards may be somewhat limited), a fiber pair could be substantially fully characterized in about four hours or less (or about 48 hours for a 12 fiber-pair cable).

The phrase "substantially fully characterize a fiber pair" refers to performing bidirectional testing over substantially all of the usable spectrum carried by the fibers in the fiber pair. This may involve testing the entire spectrum, although small gaps in the tested spectrum are acceptable so long as the amount of spectrum that is tested is sufficient to infer the performance of the fiber pair over the entire usable spectrum. The performance may be compared against the system requirements that the fiber pair is being tested against. For example, the testing terminal may include transponders that divide the usable spectrum into 120 channels evenly spaced through the entire available spectrum; substantially fully characterizing a fiber pair using this setup may involve testing all 120 channels, or most of the channels with the performance of the few that are omitted being inferable from the channels that were explicitly tested.

Although exemplary embodiments are capable of substantially fully characterizing fiber pairs at a great rate of speed, the present invention is not limited to full characterization. Some embodiments may intentionally only partially characterize the fiber pairs (e.g., using unidirectional testing instead of bidirectional testing, by testing only a selected subset of available channels or fiber pairs, etc.).

According to an eight embodiment, the first testing terminal may be a standalone device configured to interface with a cable at the first end of the fiber optic telecommunication system. For instance, the testing terminal may be a terminal stored in a portable road case, which includes testing equipment and terminating equipment similar to what would be found in signal line terminating equipment (SLTE). The first testing terminal may be connected to the cable in place of SLTE at the first location. In this way, testing equipment can be deployed where it is needed and then moved to a different testing location. The test equipment of the eighth embodiment may also be designed in a vendor-neutral manner, allowing it to test a cable configuration independent of the transmitter and receiver architecture used by a particular system. The portable nature of test equipment of the eighth embodiment also facilitates testing of all fiber pairs equipped in "Open Cable" systems where the submarine system supplier does not provide SLTE and when SLTE may not yet have been installed, or may have been installed on a subset of installed fiber pairs.

According to a ninth embodiment, the first testing terminal may be integral with signal line terminating equipment at the first end of the fiber optic telecommunication system. This embodiment eliminates the need to perform a separate set-up of test equipment, but may require a vendor-specific approach to testing. Implementing the ninth embodiment may involve adding supplemental test equipment to the SLTE to fully constitute the "test set".

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
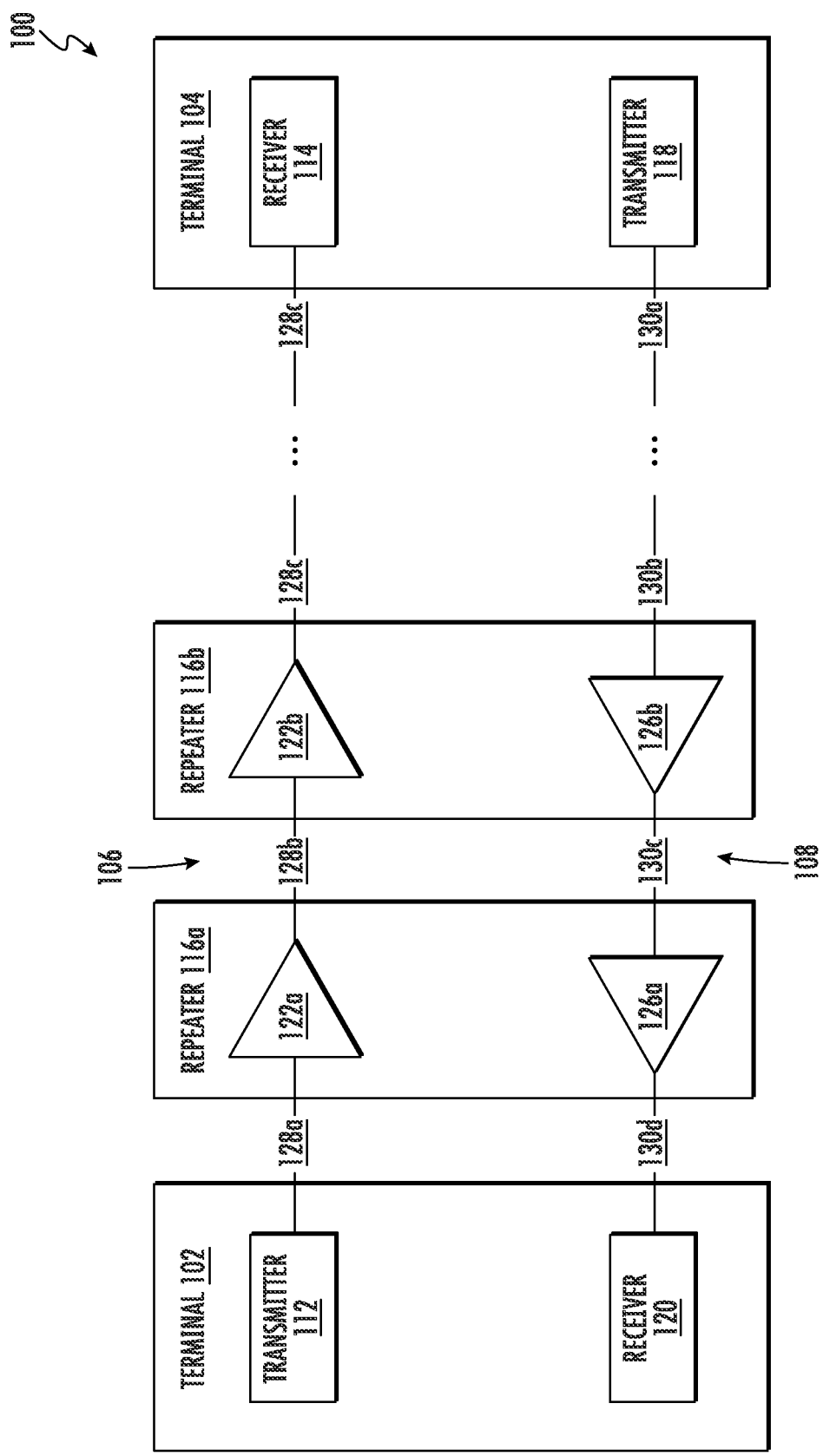
FIG. 1A depicts an exemplary fiber optic telecommunication system in accordance with one embodiment.

Exemplary embodiments provide a testing environment that allows fiber optic telecommunication systems to be tested more quickly and accurately than with conventional techniques.

Conventional testing regimens relied on expert users to select which fiber pairs and channels to test (and which tests to perform), physically visit a cable site, manually install different pieces of testing equipment, configure it to perform the desired tests, manually execute the tests (including managing all equipment iterations required to execute the tests), collate the resulting data for analysis, and transmit it (usually by email) to an analysis site.

In contrast, exemplary embodiments provide a portable testing terminal that can be plugged into a cable in place of (or supplementing) signal line terminating equipment. The portable testing terminal is configured to programmatically iterate through a set of tests that fully characterize the cable, including all channels and fiber pairs on the cable.

Consequently, the need for expert users to be physically present at the testing sites during testing is reduced or eliminated, more accurate and complete test results are generated at a significantly faster speed and lower cost, and providers of fiber optic telecommunication systems can be more confident that the significant investments required to install undersea telecommunication cables will result in desired performance characteristics.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

FIG. 1A illustrates an example of a bi-directional fiber optic telecommunication system 100. The fiber optic telecommunication system 100 may use high-bandwidth fiber optics to transmit vast amounts of data over long distances. Bi-directional data transmission may be implemented by constructing pairs of optical fiber paths within the cable and transmitting one or more dense wavelength division multiplexed (DWDM) channels per fiber pair.

As shown, the fiber optic telecommunication system 100 may include terminals 102, 104 connected by two unidirectional optical paths 106, 108, which together form a bi-directional optical path pair. The unidirectional (outbound) optical path 106 may transmit information in one direction (e.g., to the right) from a transmitter 112 at the terminal 102 to a receiver 114 at the terminal 104. The unidirectional (inbound) optical path 108 may transmit information in the other direction (e.g., to the left) from a transmitter 118 at the terminal 104 to a receiver 120 at the terminal 102. With respect to terminal 102, the optical path 106 is an outbound path and the optical path 108 is an inbound path.

The unidirectional (outbound) optical path 106 may include 130*a* . . . 130*d* and amplifiers 122*a*, 122*b*, . . . , and the unidirectional (inbound) optical path 108 may include optical fibers 132*a*, . . . 132*d* and amplifiers 126*a*, 126*b*, . . . . In some examples, the transmitter 112 and receiver 120 may be housed together as a transponder at the terminal 102, and similarly, the transmitter 118 and receiver 114 may also be housed together as a transponder at the terminal 104.

Figure 1B:
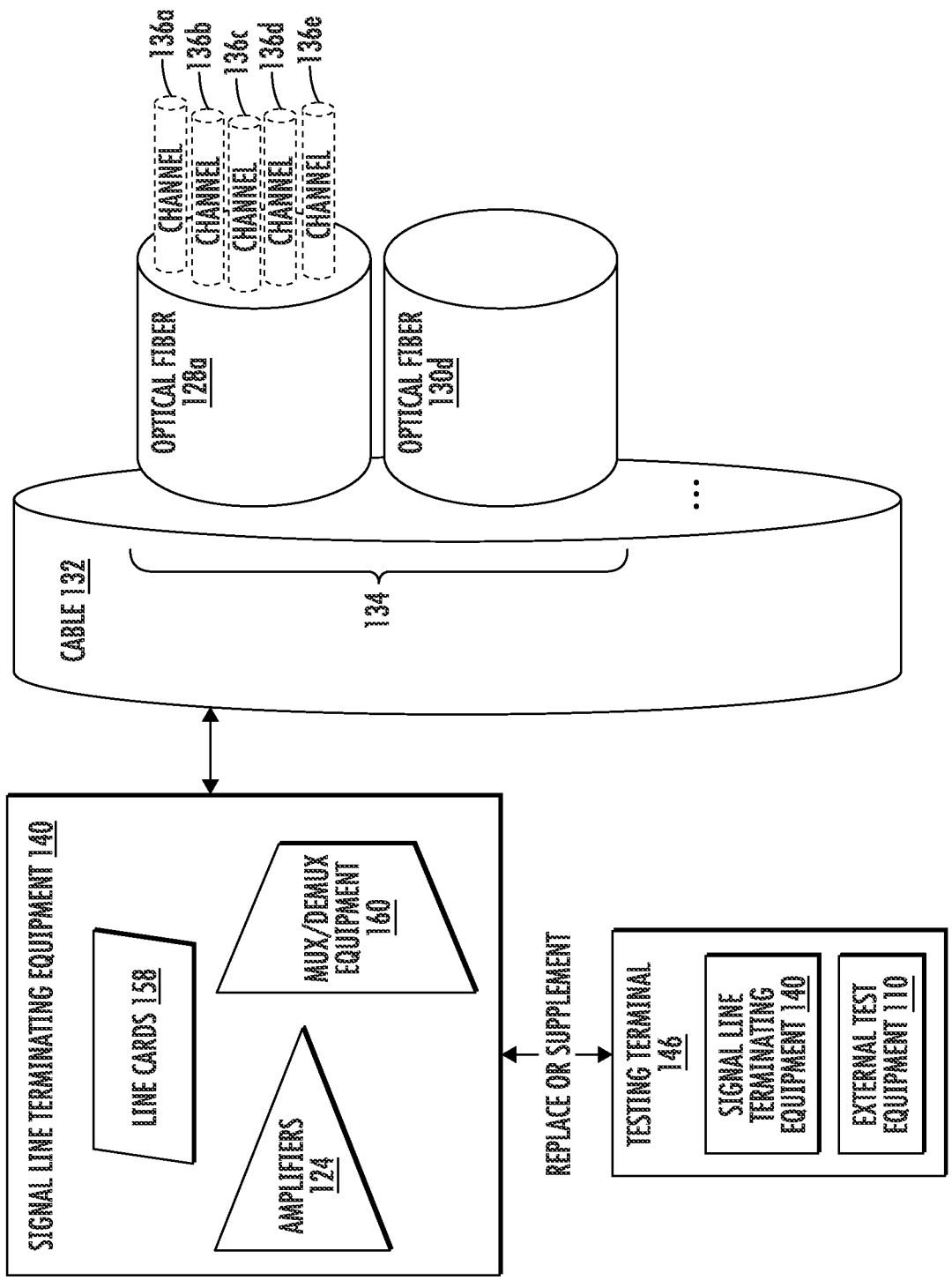
FIG. 1B depicts an exemplary cable, signal line terminating equipment, and a testing terminal in accordance with one embodiment.

The optical path pair (e.g., optical paths 106, 108) may be configured as a set of amplifier pairs 122*a*, 122*b* . . . and 126*a*, 126*b*, . . . within repeaters 116*a*, 116*b*, . . . connected by pairs of optical fibers 128*a*, . . . 128*d* and 130*a*, . . . 130*d*, which may be included in an optical fiber cable together with fibers supporting additional path pairs (see FIG. 1B for more detail). Each repeater 116*a*, 116*b*, . . . may include a pair of amplifiers 122*a*, 122*b*, etc. for each fiber pair and may include additional amplifiers for additional path pairs. The optical amplifiers 122*a*, . . . may utilize EDFAs or other rare earth doped fiber amplifiers, Raman amplifiers or semiconductor optical amplifiers.

Although an exemplary embodiment of the fiber optic telecommunication system 100 is shown and described, variations of the fiber optic telecommunication system 100 are within the scope of the present disclosure. The fiber optic telecommunication system 100 may include, for example, more optical path pairs and more or fewer repeaters. Alternatively, the fiber optic telecommunication system 100 may not include any optical amplifiers or may include, instead of optical amplifiers, optical pump power sources suitable for implementing optical gain by Raman amplification within optical fibers connecting repeaters. Moreover, it may be understood that the transmitters, receivers, transponders containing the transmitters and receivers, or any other suitable device for transmitting and receiving data, may include at least one memory and one or more processors (e.g., CPU, ASIC, FGPA, any conventional processor, etc.) to execute instructions stored in memory, as will be further described below.

FIG. 1B depicts an exemplary arrangement of a fiber pair 136 inside a cable 134, and shows how the cable 134 terminates in signal line terminating equipment 142.

The cable 134 may contain a number of optical fibers 130*a*, 132*d*, often arranged into fiber pairs 136 as described above. An optical fiber may be made up of one or more relatively thin, flexible strands of light transmitting material, such as glass or plastic.

Each optical fiber 130*a* may be subdivided into one or more channels 138*a*, . . . . Each channel may represent a physical or logical division of the optical fiber 130*a*; for example, the optical fiber 130*a* may be capable of carrying light at a number of different wavelengths, and each channel may represent a different range of wavelengths.

The cable 134 may carry the optical fibers optical fiber 130*a*, 132*d*, . . . between two different locations. At each location, signal line terminating equipment 142 may transmit information onto, or read information from, the optical fibers 130*a*, 132*d*. The signal line terminating equipment 142 may include, for example, one or more line cards 160 configured to interface with the optical fibers 130*a*, 132*d* and/or electronic equipment for generating or reading a signal. For instance, the line cards 160 may include or may interface with mux/demux equipment 162 for multiplexing or demultiplexing an optical signal. The line cards 160 may also include or may interface with one or more amplifiers 124 configured to amplify signal (e.g., before or after multiplexing/demultiplexing). The signal line terminating equipment 142 may be configured to terminate an optical path represented by the cable 134 and transfer the signal to a different optical path or to an electrical signal path.

According to exemplary embodiments, the signal line terminating equipment 142 may be replaced or supplemented by a testing terminal 148. For example, the cable 134 may be plugged into the testing terminal 148 in place of the signal line terminating equipment 142, or the testing terminal 148 may plug into the signal line terminating equipment 142 for testing purposes.

In some embodiments, the testing terminal 148 may be a computing terminal deployed in a standalone portable road case. Among other components, the testing terminal 148 may include signal line terminating equipment 142 such as line cards 160, amplifiers 124, and mux/demux equipment 162. The testing terminal 148 may also include external test equipment 110 for performing tests (e.g., optical signal to noise ratio tests, generalized optical signal-to-noise ratio tests, gain tests, etc.) on the optical fibers 130*a*, 132*d*. Examples of external test equipment 110 include (but are not limited to) Optical Spectrum Analyzers (OSA), Optical Power Meters (OPM), Optical Switches (OS), Variable Optical Attenuators (VOA), etc. The testing terminal 148 is described in more detail in connection with FIG. 2 below.

Figure 1C:
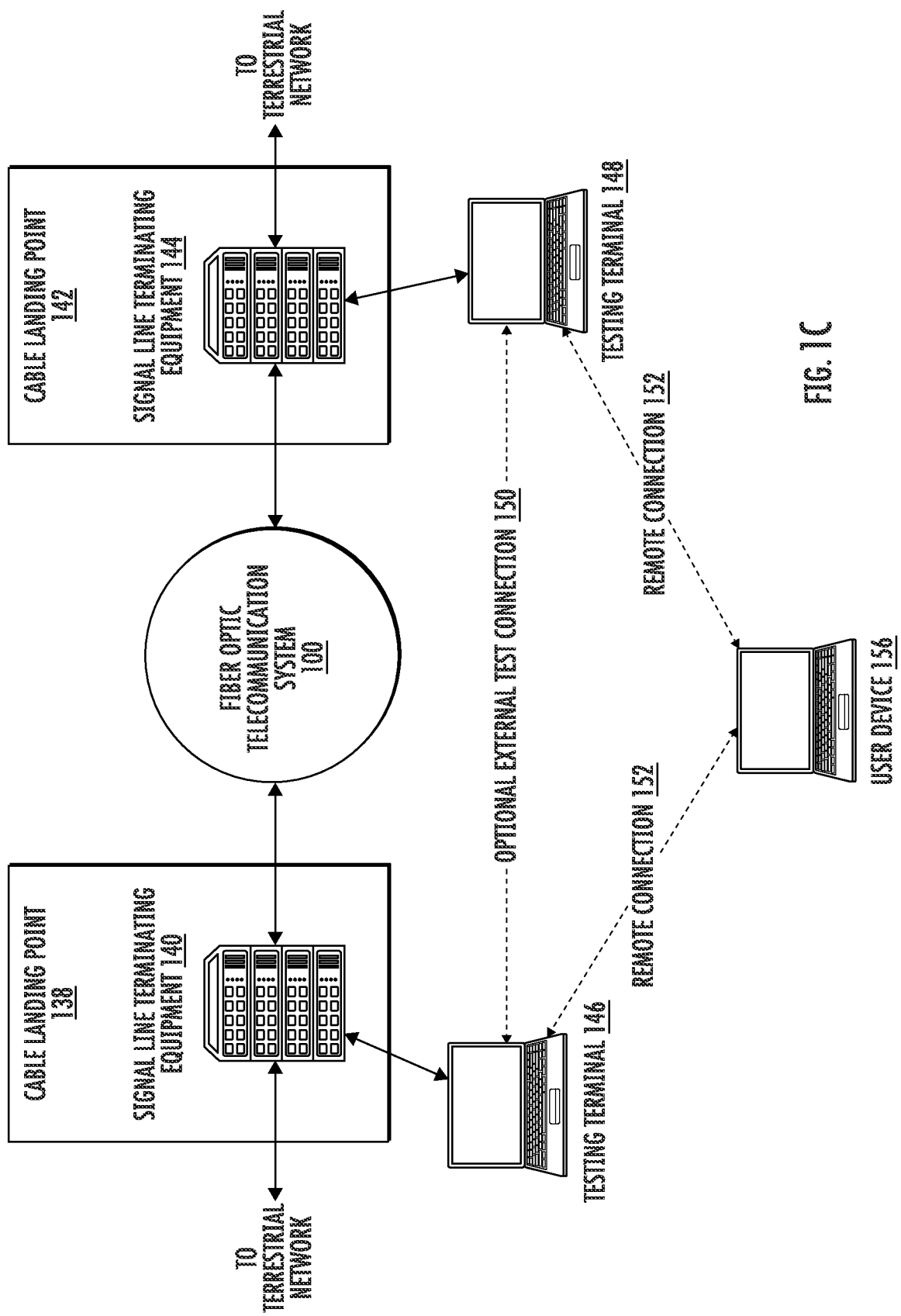
FIG. 1C depicts an exemplary testing configuration in accordance with one embodiment.

Prior to examining the testing terminal 148 in more detail, however, FIG. 1C depicts an exemplary testing configuration showing how a testing terminal 148 might be deployed in the context of a larger network. A fiber optic telecommunication system 100 (in this case, an undersea fiber optic cable) extends between two cable landing points 140, 144. The cable landing points 140, 144 represent landfall points for a submarine cable. They may include facilities such as a cable landing station or cable termination station.

Signal line terminating equipment 142, 146 may connect the fiber optic telecommunication system 100 to a terrestrial network. As previously noted, for testing purposes a testing terminal 148, 150 may connect to or replace the signal line terminating equipment 142, 146.

The testing terminals 148, 150 may need to communicate with each other (e.g., to exchange information about how the external test equipment 110 is configured, information about the test data being transmitted so that successful receipt of the test data can be confirmed, etc.). This exchanged information may be distinct from the information transmitted as part of the test. The testing terminals 148, 150 may be capable of communicating with each other over the fiber optic telecommunication system 100 and/or via an optional external test connection 152 (such as a wired or wireless Internet connection). In one embodiment, the testing terminals 148, 150 may communicate over the fiber currently being tested (e.g., on a channel of the fiber that is not currently under test). In another embodiment, the testing terminals 148, 150 may communicate on the same cable that includes the fiber currently under test, but on a different fiber in the cable. Still further, the testing terminals 148, 150 may communicate over the optional external test connection 152 without using the cable (except for transmitting the data that forms part of the test).

The testing terminals may also include an interface for remotely connecting to a user device 158 via remote connections 154, 156. The remote connections 154, 156 may be used to transmit user commands from the user device 158 and receive testing data in response. In this way, a user may remotely control the testing terminals 148, 150 to cause them to perform tests without the user being physically present at the cable landing point 140, 144.

Figure 2:
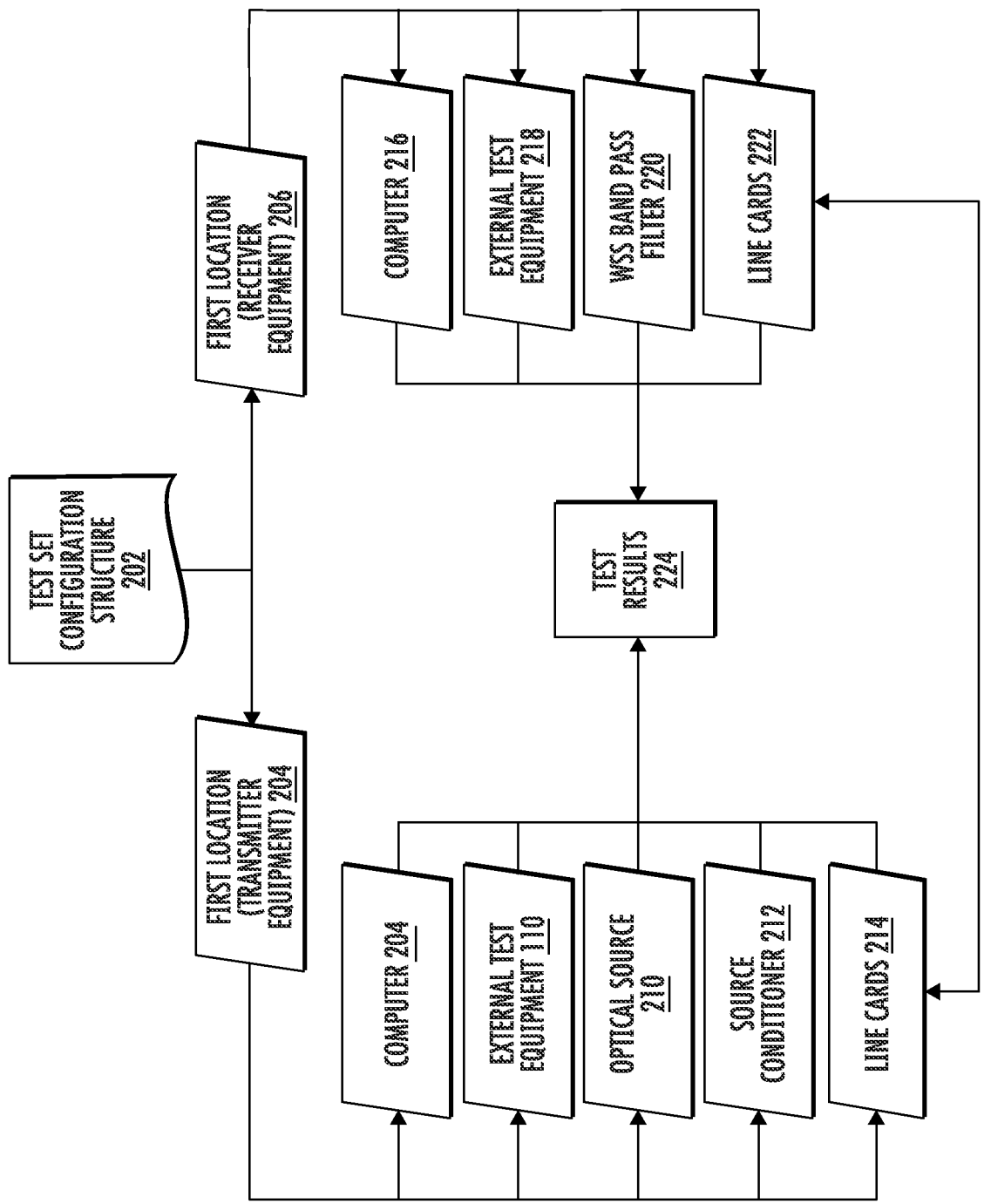
FIG. 2 illustrates communication between two testing terminals in accordance with one embodiment.

FIG. 2 depicts an exemplary configuration for testing terminals in accordance with exemplary embodiments.

The testing terminals may be configured to access a test set configuration structure 202, such as a file or other data structure that includes different predefined configurations for components of the testing terminal, which may be used to perform various tests. Because certain characteristics of the optical transmission vary with (e.g.) the input frequency and input power, it may be beneficial to change the power profile of the transmitter depending on the type of test being performed. For example, when performing a generalized optical signal-to-noise ratio analysis, the performance of the network under flat transmitter power (e.g., where the channel pre-emphasis is set to equalize the power spectral density at the transmitter) may be of interest. Thus, the test set configuration structure 202 may include loading schemes that are optimized for different types of tests that might be performed (e.g., a flat input spectrum loading scheme, an optical signal-to-noise ratio optimized loading scheme, or an optimized generalized optical signal-to-noise ratio loading scheme). The test set configuration structure 202 may be configured with a number of predetermined configurations that are mapped to a test or tests for which they may be used. A single test may be mapped to more than one configuration, in which case the testing terminal may be configured to perform the test with each configuration.

The test set configuration structure 202 may define settings for a transmitter (located at a first location 204) and a receiver (located at a second location 206) that take part in the test. A testing terminal at the first location 204 and a testing terminal at the second location 206 may therefore access the test set configuration structure 202 in order to configure themselves for a given test.

The testing may involve generating test signals at the testing terminal at the first location 204 and receiving the test signals at the testing terminal at the second location 206. By comparing the transmitted test signal to the received test signal, the testing terminals can determine (for example) the signal-to-noise ratio or gain on the fiber(s) being tested. In order to perform these measurements, the test terminals may also need to exchange information that is not a part of the test signals (e.g., on the optional external test connection 152 or over the cable/fibers, as described above).

The testing terminal at the first location 204 may include certain equipment used for generating and transmitting test signals, and for measuring the performance of the transmitter. The test may be controlled by a computer 208, which configures the testing terminal at the first location 204 based on one or more of the predetermined configurations from the test set configuration structure 202. The computer 208 may generate the testing signals and analyze information received from the testing terminal at the second location 206 in order to determine the results of the test (as described in more detail in connection with FIG. 4).

In order to transmit the test signals, the testing terminal at the first location 204 may include one or more line cards 214 for interfacing with the cable and the optical fibers on which the test will be run. An optical source 210 (e.g., a broadband noise source) may generate light that is then shaped by a source conditioner 212 (e.g. Wavelength Selective Switch (WSS)) to create the loading signals for transmission over the cable.

In order to perform the tests, the testing terminal at the first location 204 may also include external test equipment 110, such as switches, attenuators, etc. This external test equipment 110 may be configured to modify the signal created by the optical source 210 and source conditioner 212 based on the requirements of the test being performed.

At the second location 206, the testing terminal may include a computer 216, external test equipment 218, and line cards 222 similar to or corresponding to those included at the first location 204. In some embodiments, the testing terminal at the second location 206 may further include a WSS band pass filter 220 in order to read wavelength modulated signals.

The optical source 210, source conditioner 212, line cards 214, and external test equipment 110 may be configured by the computer 208 using the information from the test set configuration structure 202. Similarly, the external test equipment 218, WSS band pass filter 220, and line cards 222 may be configured by the computer 216 based on the test set configuration structure 202. The results of the test may be stored as test results 224 in a suitable data structure (e.g., a file, database, etc.).

Figure 3:
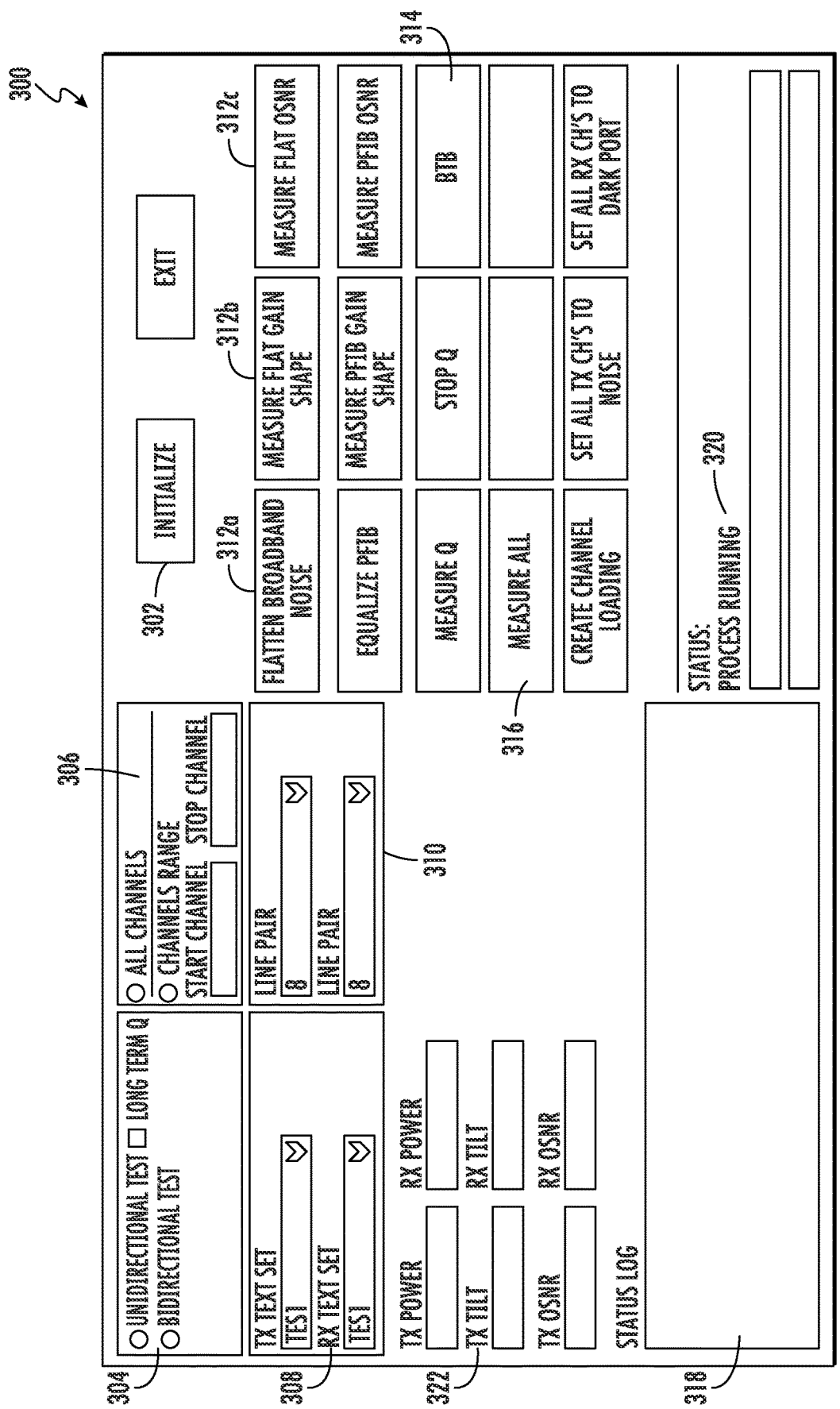
FIG. 3 illustrates an exemplary testing interface in accordance with one embodiment.

A user may set up a test using the testing terminals though a graphical user interface. FIG. 3 depicts an exemplary graphical user interface 300 suitable for use with exemplary embodiments.

The graphical user interface 300 includes an initialization element 302. When selected, the initialization element may generate a control signal that causes one or more testing terminals (as identified, for example, by the test set selector 308) to perform a set of tests (as identified, for example, by the test selectors 312a, 312b, 312c, . . . ) using the options specified in the graphical user interface 300.

One of those options may be the directionality of the test (e.g., unidirectional or bidirectional). In a unidirectional test, testing terminals at both locations may carry out the test, measuring (for instance) the Q performance in a single direction along the optical fiber. During the test, a test signal may be sent along the optical fiber from the first testing terminal which may be received at the second testing terminal where characteristics such as Q factor are measured. This may represent a unidirectional test because it relies on a testing signals transmitted in only one direction. In some cases, measuring characteristics for both directions of transmission can be achieved by also making measurements at the other end of the cable. In a bidirectional test, a second testing terminal at a second location also measures the characteristics of interest. The measurements from the first testing terminal are then combined with the measurements from the second testing terminal. Although a bidirectional test may more thoroughly characterize a fiber pair, it also takes more time and resources. Both unidirectional and bidirectional tests require cooperation between test sets. A test directionality selector 304 on the graphical user interface 300 allows the user to choose the directionality of the test to be performed.

A channel selector 306 allows the user to specify which channels of the fiber will be tested. For example, the user can choose to test all channels along the fiber, or a subset of channels (e.g., channels in a range from a starting channel to an ending channel).

A test set selector 308 allows the user to select the test set pairs to be utilized for a specific test or set of tests. The test sets may be stored in an appropriate data structure (e.g., a test set file), which may be loaded through the test set selector 308.

A line pair selector 310 allows the user to specify which fiber pair should be tested. In some embodiments, the user can select a single fiber or fiber pair. In others, the user may be permitted to select multiple fiber pairs for testing, up to and including all the fiber pairs on the cable.

Test selectors 312a, 312b, 312c, etc. allow the user to select specific tests to be performed. These include, for example, measuring the noise on the fiber, signal-to-noise ratio, optical Q, gain shape, etc. An all test selector 316 allows the user to flag that all the available tests should be performed, in which case the system may identify all available tests and serially perform each one.

A back-to-back characterization element 314, configures the system to perform a back-to-back characterization of the cable. Using this option, characteristics of the deployed testing terminal that will perform tests of the cable are measured, and compared to a previous measurement of the same characteristics when the testing terminal was previously tested in a lab. Any changes to the testing terminals (e.g., changes that might have occurred during transport or deployment of the testing terminals) can be detected during back-to-back testing and filtered out of the test results.

A status log 318, a status indicator 320, and output values 322 may display results of the testing. For instance, the output values 322 may be updated as tests are performed to show the transmitter/receiver power, tilt, and signal-to-noise ratio. The status indicator 320 may show whether a test is being run or is completed (and which test is currently being performed), and the status log 318 may show any other details pertinent to the test that are not covered by the status indicator 320 and output values 322.

Figure 4:
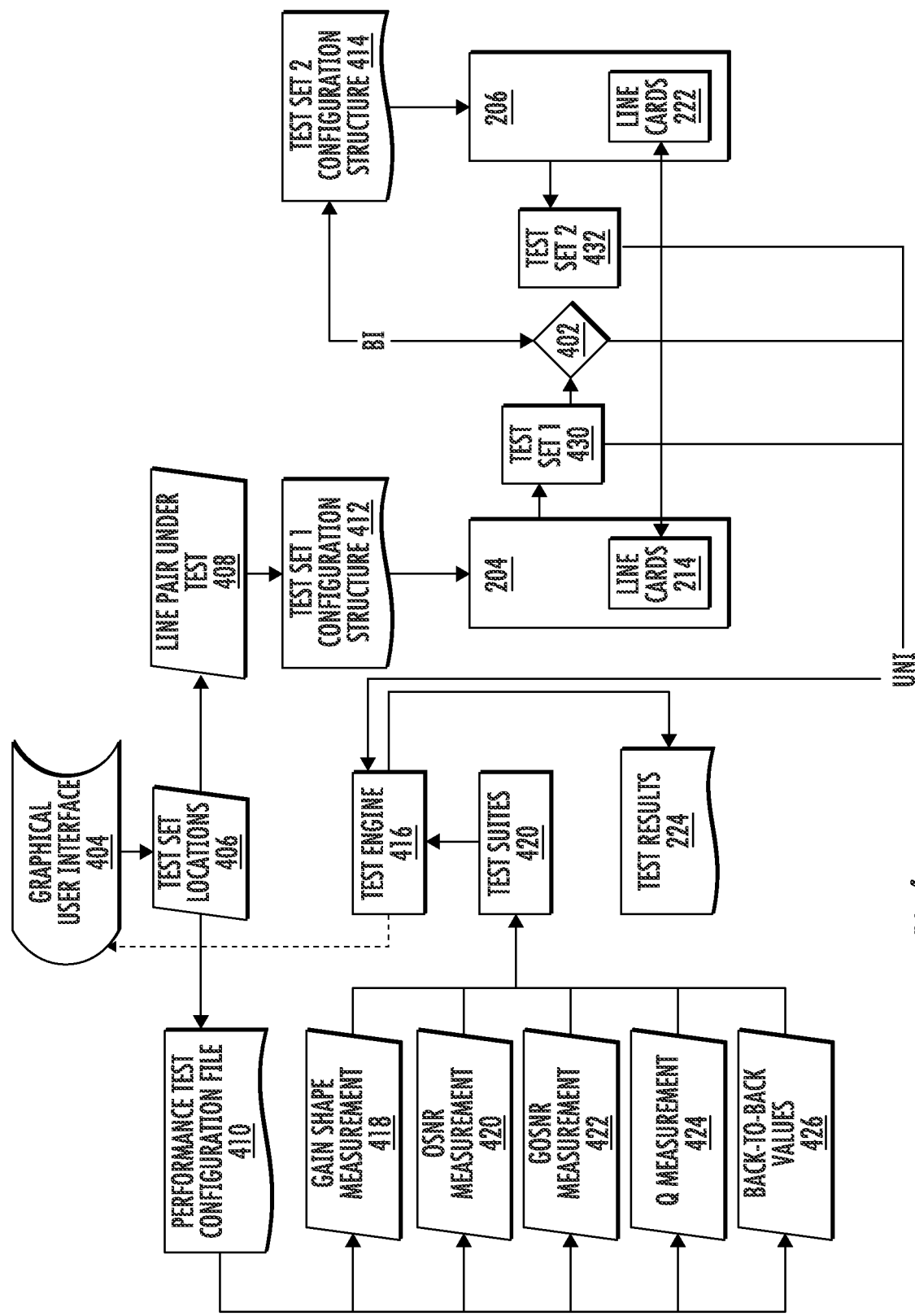
FIG. 4 is an overview of an exemplary testing procedure in accordance with one embodiment.

FIG. 4 depicts an exemplary testing configuration in accordance with exemplary embodiments.

The test may be carried out using a computer or other electronic device; as noted above, the testing computer may be at a location remote from the test set locations 406 of the testing terminals that are deployed at the ends of the line pair under test 408. The computer may provide a graphical user interface 404, such as the graphical user interface 404 depicted in FIG. 3.

At each of the test set locations 406, a testing terminal performs a test. The tests performed may be designated and configured through a performance test configuration file 410, which may be local to the computer hosting the graphical user interface 404 or stored in a remote location. The performance test configuration file 410 may include instructions that configure a testing terminal to perform certain tests; examples of tests for which instructions may be stored in the performance test configuration file 410 include gain shape measurement 418, OSNR measurement 420, GOSNR measurement 422, and Q measurement 424. The performance test configuration file 410 may also include back-to-back values 426 from back-to-back testing. The back-to-back values 426 may be used to filter out artifacts caused by the testing equipment from the test results 224.

Based on the selections made in the graphical user interface 404 as to which tests should be performed, the instructions for each test may be copied from the performance test configuration file 410 to one or more test suites 428. For instance, the test engine 416 may identify the tests selected to be performed, determine which loading scheme(s) are appropriate to the selected tests, and retrieve predetermined configurations corresponding to the loading schemes for the testing terminals that will perform the tests. In one example, the different tests may be loaded into the test suites 428 so that the tests are carried out sequentially. The test suites may then be compiled by a test engine 416 and sent to the computer hosting the graphical user interface 404 and/or the testing terminals.

When the initialization element 302 is selected in the graphical user interface 404, the computer may instruct the testing terminals at the test set locations 406 to perform the tests provided by the test engine 416. Accordingly, the computer sends a command signal to the test set locations 406, which is then received by the testing terminals. The command signal may include a data structure storing parameters, values, and instructions for configuring each individual test terminal to perform the tests. Different types of test terminals may be present at the different test set locations 406, and each testing terminal may be interfacing with different equipment due to different setups at each end of the line pair under test 408. Accordingly, each may be provided with a customized configuration data structure. In this example, the transmitter testing terminal is located at a first location (transmitter equipment) 204, and is configured with a test set 1 configuration structure 412. Meanwhile, the receiver testing terminal is located at a second location (receiver equipment) 206 and is configured with a test set 2 configuration structure 414. The configuration structures may be files or data structures stored in a memory of the testing terminals, and may include configuration parameters, instructions, values, etc. for configuring the various components of the testing terminals (e.g., the computer 208, external test equipment 110, optical source 210, source conditioner 212, line cards 214, computer 216, external test equipment 218, WSS band pass filter 220, line cards 222, etc.).

Based on the test suites 428 and the configuration structure(s) 412, 414, the testing terminals may carry out the test and measure various parameters relating to the performance of the line pair under test 408 (e.g., gain shape, OSNR, Q and GOSNR.). In decision block 402, the testing terminal may determine whether the test is unidirectional or bidirectional. If unidirectional, then the first testing terminal at the first location 204, as configured by the test set 1 configuration structure 412, may serve as a transmitter and the second testing terminal at the second location 206 may serve as a receiver. The testing terminals may generate test results and/or raw data in the form of a first test set 430. The first test set 430 may be sent to the test engine 416 for storage in the test results 224 and/or display on the graphical user interface 404.

If the test is instead bidirectional, then the test may involve transmitting testing information from the first test set (acting as a transmitter) to the second test set (acting as a receiver) over a first fiber of a fiber pair, and transmitting testing information from the second test set (acting as a transmitter) to the first test set (acting as a receiver) over a second fiber of the fiber pair. The testing terminal at the second location 206 may be configured based on a test set 2 configuration structure 414. During the test, the testing terminal at the first location 204 may generate a first test set 430 and the testing terminal at the second location 206 may generate a second test set 432. The two test sets may be sent to the test engine 416 for storage in the test results 224 and/or display on the graphical user interface 404.

In a unidirectional or bidirectional test, the two test sets may be individually controlled by separate computers or may be controlled by a single computer.

Figure 5:
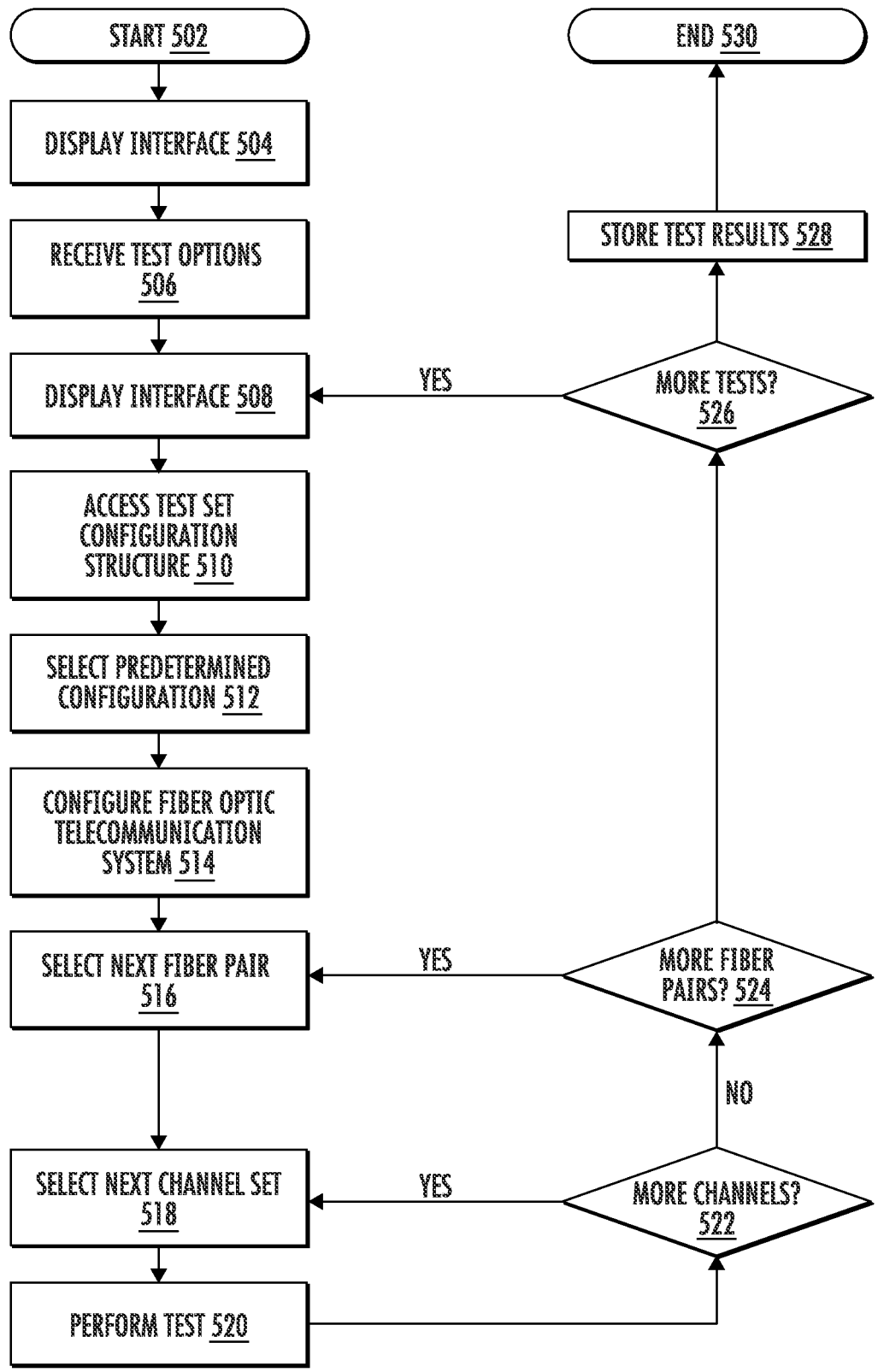
FIG. 5 is a flowchart depicting exemplary logic for performing fiber optic testing in accordance with one embodiment.

FIG. 5 is a flowchart depicting exemplary logic for performing a computer-implemented method according to an exemplary embodiment. The logic may be embodied as instructions stored on a computer-readable medium configured to be executed by a processor. The logic may be implemented by a suitable computing system configured to perform the actions described below.

Processing may begin at start block 502. Start block 502 may be triggered, for example, by a user loading a testing application on a testing computer, which may be local to or remote from testing terminals that will carry out the testing.

In block 504, the system may display an interface, such as the one depicted in FIG. 3. The interface may allow the user to configure one or more of the testing terminals that will perform the tests. The interface may allow the user to select the tests to be performed, to test the cable(s), fiber pair(s), and/or channels that will be tested, to configure the testing equipment, to view results of the tests in real-time, and to store and retrieve test results, among other possibilities. These parameters may be received through the interface at block 506.

In block 508, the system may select the next to be performed, as identified in block 506. In block 510, the system may access a test set configuration structure that includes predetermined configurations for performing various tests. The predetermined configurations may be in the form of, or may include, loading schemes for the transmitter/receiver equipment used to perform the tests. The system may look up the test and/or testing equipment in the test set configuration structure, and retrieve a corresponding predetermined configuration in block 512.

In block 514, the system may configure the fiber optic telecommunication system based on the predetermined configuration retrieved in block 514. For example, the system may adjust one or more of the settings for the different types of equipment in the testing terminals that will take part in the test (e.g., changing settings on the optical source 210, the source conditioner 212, the external test equipment 110, etc.).

In block 516, the system may select the next fiber pair to be tested (based on the fiber pair(s) selected at block 506). In block 518, the system may select the next channel for testing on the selected fiber pair. The channel may be specified as a range of values (e.g., a range of wavelengths), or based on a channel identifier (e.g., "channel 1").

In block 520, the system may perform the test selected at block 508 on the fiber pair selected in block 516 and the channel selected in block 518. The test may be performed using the configuration set up at block 514. As the test is carried out, the testing terminal(s) may measure aspects or parameters of the fiber pair being tested, as required by the test being performed. If the testing is performed bidirectionally, the testing terminals at either end of the fiber pair under test may perform the measurements. The measured values may written to a file or temporary data structure as test results.

When a test is completed, processing may proceed to decision block 522, where the system determines if more channels remain to be tested in the current test. If so, processing returns to block 518, and the system performs the test on the next set of channels.

In decision block 524, after completing the current test on all the channels for the current fiber pair, the system determines if more fiber pairs remain to be tested. If so, processing reverts to block 516 and the next fiber pair is selected for testing.

When the test has been carried out for all the selected channels on all the selected fiber pairs, the system moves on to the next test in the test suite, if one is present. In decision block 526, the system determines if more tests remain to be carried out—if so, processing reverts to block 508 and the next test is selected.

Once all tests have been completed, in block 528 the system may store the results of the tests in a non-transitory computer-readable medium. The results of the tests may be transmitted back to the testing computer that originally displayed the interface, so that the interface can be updated to display the test results. Processing may then proceed to done block 530 and end.

Figure 6:
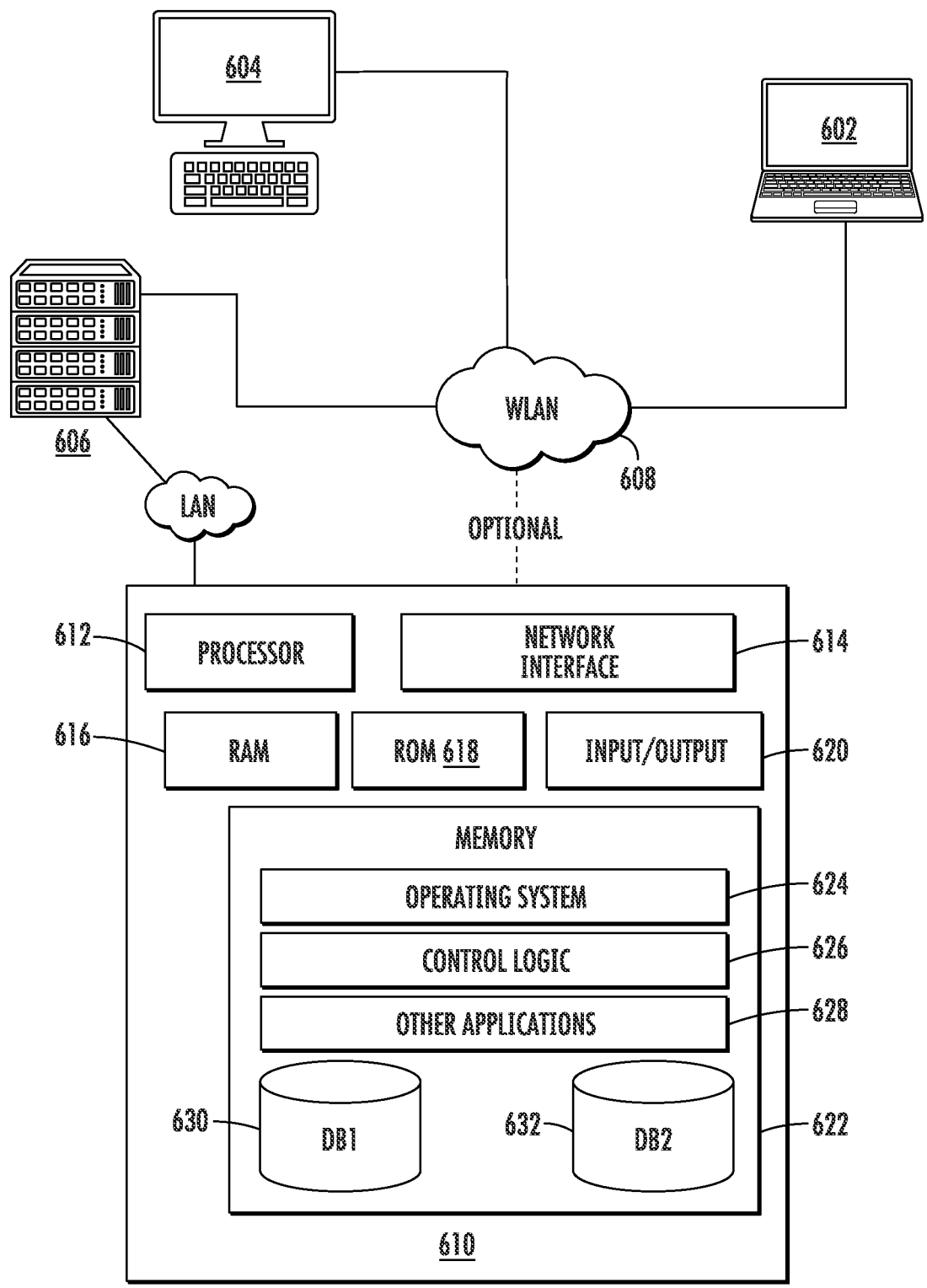
FIG. 6 depicts an illustrative computer system architecture that may be used to practice exemplary embodiments described herein.

Although FIG. 5 shows certain steps being performed in a particular order for ease of discussion, it is understood that exemplary embodiments may involve more or fewer logical blocks, which may be performed in different orders, sequentially, and/or in parallel. For example, FIG. 6 depicts an example where the system selects a configuration for a test, carries it out, and then moves on to the next test. In some embodiments, however, the system may select the configurations for all of the tests at once, load them into a test set configuration structure, and then execute the tests.

After a user provides the test options in block 506, the remaining actions (in block 508 through block 528) may be performed programmatically without user input. This allows the testing to be performed in an efficient manner, so that all channels and fiber pairs on a cable can be tested bidirectionally in a relatively short period of time (e.g., less than about 24 hours).

FIG. 6 illustrates one example of a system architecture and data processing device that may be used to implement one or more illustrative aspects described herein in a stand-alone and/or networked environment. Various network nodes, such as the data server 610, web server 606, computer 604, and laptop 602 may be interconnected via a wide area network 608 (WAN), such as the internet. Other networks may also or alternatively be used, including private intranets, corporate networks, LANs, metropolitan area networks (MANs) wireless networks, personal networks (PANs), and the like. Network 608 is for illustration purposes and may be replaced with fewer or additional computer networks. A local area network (LAN) may have one or more of any known LAN topology and may use one or more of a variety of different protocols, such as ethernet. Devices data server 610, web server 606, computer 604, laptop 602 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 610, web server 606, and client computer 604, laptop 602. Data server 610 provides overall access, control and administration of databases and control software for performing one or more illustrative aspects described herein. Data serverdata server 610 may be connected to web server 606 through which users interact with and obtain data as requested. Alternatively, data server 610 may act as a web server itself and be directly connected to the internet. Data server 610 may be connected to web server 606 through the network 608 (e.g., the internet), via direct or indirect connection, or via some other network. Users may interact with the data server 610 using remote computer 604, laptop 602, e.g., using a web browser to connect to the data server 610 via one or more externally exposed web sites hosted by web server 606. Client computer 604, laptop 602 may be used in concert with data server 610 to access data stored therein, or may be used for other purposes. For example, from client computer 604, a user may access web server 606 using an internet browser, as is known in the art, or by executing a software application that communicates with web server 606 and/or data server 610 over a computer network (such as the internet).

Servers and applications may be combined on the same physical machines, and retain separate virtual or logical addresses, or may reside on separate physical machines. FIG. 6 illustrates just one example of a network architecture that may be used, and those of skill in the art will appreciate that the specific network architecture and data processing devices used may vary, and are secondary to the functionality that they provide, as further described herein. For example, services provided by web server 606 and data server 610 may be combined on a single server.

Each component data server 610, web server 606, computer 604, laptop 602 may be any type of known computer, server, or data processing device. Data server 610, e.g., may include a processor 612 controlling overall operation of the data server 610. Data server 610 may further include RAM 616, ROM 618, network interface 614, input/output interfaces 620 (e.g., keyboard, mouse, display, printer, etc.), and memory 622. Input/output interfaces 620 may include a variety of interface units and drives for reading, writing, displaying, and/or printing data or files. Memory 622 may further store operating system software 624 for controlling overall operation of the data server 610, control logic 626 for instructing data server 610 to perform aspects described herein, and other application software 628 providing secondary, support, and/or other functionality which may or may not be used in conjunction with aspects described herein. The control logic may also be referred to herein as the data server software control logic 626. Functionality of the data server software may refer to operations or decisions made automatically based on rules coded into the control logic, made manually by a user providing input into the system, and/or a combination of automatic processing based on user input (e.g., queries, data updates, etc.).

Memory 1122 may also store data used in performance of one or more aspects described herein, including a first database 632 and a second database 630. In some embodiments, the first database may include the second database (e.g., as a separate table, report, etc.). That is, the information can be stored in a single database, or separated into different logical, virtual, or physical databases, depending on system design. Web server 606, computer 604, laptop 602 may have similar or different architecture as described with respect to data server 610. Those of skill in the art will appreciate that the functionality of data server 610 (or web server 606, computer 604, laptop 602) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
displaying an interface configured to present testing options for testing an undersea fiber optic cable;
receiving a selection of a set of the testing options using the interface;
accessing a test set configuration structure comprising a plurality of predetermined configurations for the undersea fiber optic cable;
automatically selecting one of the predetermined configurations based on the selected set of testing options;
programmatically configuring the undersea fiber optic cable with the selected predetermined configuration;
testing a first of a plurality of fibers within the undersea fiber optic cable using the selected set of testing options to generate test results, the testing comprising communicating a broadband test signal between a first testing terminal physically located at a first end of the undersea fiber optic cable and a second testing terminal physically located at a second end of the undersea fiber optic cable over a second of the plurality of fibers within the undersea fiber optic cable including the first of the plurality of fibers under test;
and
storing the test results in a non-transitory computer-readable storage medium.

2. The computer-implemented method of claim 1, wherein each of the plurality of fibers carry data on separate optical channels, the broadband test signal communicated between the first and second testing terminals is distinct from the data carried on separate optical channels.

3. The computer-implemented method of claim 1, wherein the predetermined configurations comprise loading schemes for the undersea fiber optic cable, the loading schemes comprising one or more of a flat input spectrum loading scheme, an optical signal-to-noise ratio optimized loading scheme, or an optimized generalized optical signal-to-noise ratio loading scheme.

4. The computer-implemented method of claim 1, wherein the testing accesses values from a back-to-back test to remove testing equipment artifacts from the test results.

5. The computer-implemented method of claim 1, wherein the testing is bidirectional and is configured to substantially fully characterize all fiber pairs in the undersea fiber optic cable.

6. The computer-implemented method of claim 1, wherein the testing automatically iterates over a plurality of channels in a fiber of a fiber pair within the undersea fiber optic cable at a rate sufficient to substantially fully characterize the fiber pair in 4 hours or less.

7. The computer-implemented method of claim 1, wherein the testing is initiated through a remote connection to the first testing terminal and the second testing terminal.

8. A non-transitory computer-readable storage medium, the computer-readable storage medium including instructions that when executed by a computer, cause the computer to:
display an interface configured to present testing options for testing an undersea fiber optic cable;
receive a selection of a set of the testing options using the interface;
access a test set configuration structure comprising a plurality of predetermined configurations for the undersea fiber optic cable;
automatically select one of the predetermined configurations based on the selected set of testing options;
programmatically configure the undersea fiber optic cable with the selected predetermined configuration;
test a first of a plurality of fibers within undersea fiber optic cable using the selected set of testing options to generate test results, the testing comprising bidirectionally communicating a broadband test signal between a first testing terminal physically located at a first end of the undersea fiber optic cable and a second testing terminal physically located at a second end of the undersea fiber optic cable over a second of the plurality of fibers within the undersea fiber optic cable including the first of the plurality of fibers under test to generate a first set of test measurements from the first testing terminal and a second set of test measurements from the second testing terminal;

combine the first set of test measurements with the second set of test measurements; and store the combined test results in a non-transitory computer-readable storage medium.

9. The computer-readable storage medium of claim 8, wherein each of the plurality of fibers carry data on separate optical channels, the broadband test signal communicated between the first and second testing terminals is distinct from the data carried on separate optical channels.

10. The computer-readable storage medium of claim 8, wherein the predetermined configurations comprise loading schemes for the undersea fiber optic cable, the loading schemes comprising one or more of a flat input spectrum loading scheme, an optical signal-to-noise ratio optimized loading scheme, or an optimized generalized optical signal-to-noise ratio loading scheme.

11. The computer-readable storage medium of claim 8, wherein the testing accesses values from a back-to-back test to remove testing equipment artifacts from the test results.

12. The computer-readable storage medium of claim 8, wherein the testing is configured to substantially fully characterize all fiber pairs in the undersea fiber optic cable.

13. The computer-readable storage medium of claim 8, wherein the testing automatically iterates over a plurality of channels in the fiber of a fiber pair within the undersea fiber optic cable at a rate sufficient to substantially fully characterize the fiber pair in 4 hours or less.

14. The computer-readable storage medium of claim 8, wherein the testing is initiated through a remote connection to the first testing terminal and the second testing terminal.

15. A computing apparatus comprising:
a processor; and
a memory storing instructions that, when executed by the processor, configure the apparatus to:
display an interface configured to present testing options for testing an undersea fiber optic cable;
receive a selection of a set of the testing options using the interface;
access a test set configuration structure comprising a plurality of predetermined configurations for the undersea fiber optic cable;
automatically select one of the predetermined configurations based on the selected set of testing options;
programmatically configure the undersea fiber optic cable with the selected predetermined configuration, the undersea fiber optic cable comprising a first end at which first testing terminal is located and a second end at which a second testing terminal is located;
test a first of a plurality of fibers within the undersea fiber optic cable using the selected set of testing options to generate test results, the testing comprising bidirectionally communicating a broadband test signal between the first testing terminal and the second testing terminal over a second of the plurality of fibers within the undersea fiber optic cable including the first of the plurality of fibers under test to generate a first set of test measurements and communicating between the second testing terminal and the first testing terminal to generate a second set of test measurements for the fiber;
combine the first set of test measurements with the second set of test measurements to generate a combined set of test results for the first of a plurality of fibers; and
store the combined test results in a non-transitory computer-readable storage medium.

16. The computing apparatus of claim 15, further comprising a communications interface configured to establish a remote connection to a user device and to receive testing initiation or configuration commands through the remote connection.

17. The computing apparatus of claim 15, wherein the predetermined configurations comprise loading schemes for the undersea fiber optic cable, the loading schemes comprising having one or more of a flat input spectrum loading scheme, an optical signal-to-noise ratio optimized loading scheme, or an optimized generalized optical signal-to-noise ratio loading scheme.

18. The computing apparatus of claim 15, wherein the first testing terminal is a standalone device configured to interface with the fiber at the first end of the undersea fiber optic cable.

19. The computing apparatus of claim 15, wherein the first testing terminal is integral with signal line terminating equipment at the first end of the undersea fiber optic cable.

* * * * *